F. SKERL.
TICKET MACHINE.
APPLICATION FILED NOV. 29, 1915.

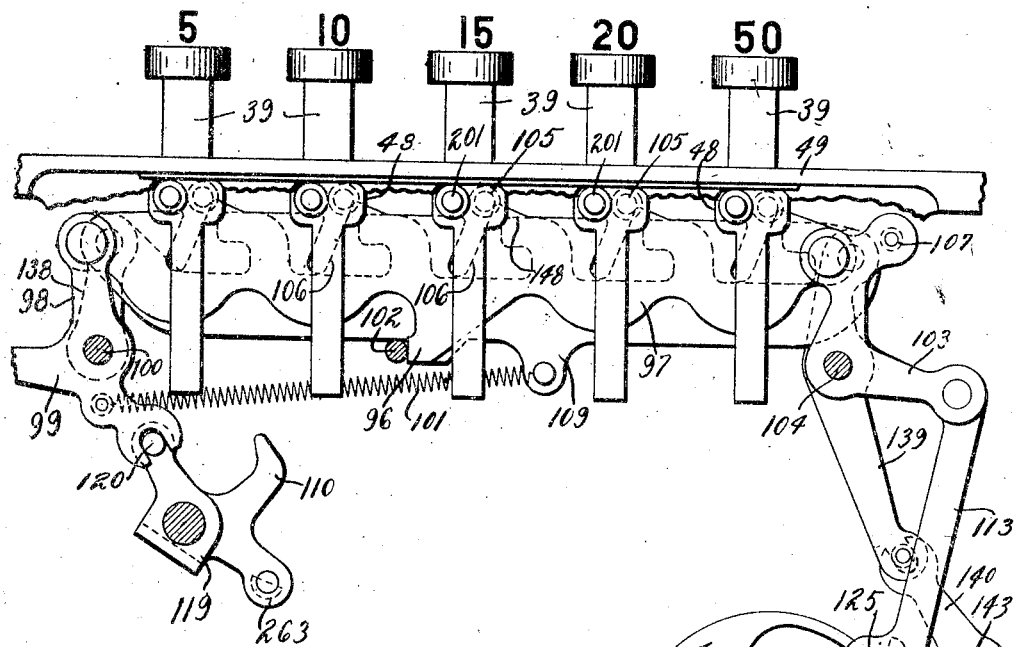
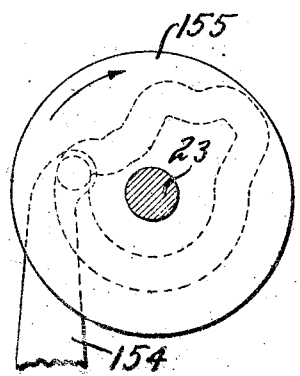
FIG.3.
FIG.4.

1,313,958.

Patented Aug. 26, 1919.
9 SHEETS—SHEET 5.

Inventor
FRANCESCO SKERL
by R. Schless
Carl Beust
Attorneys

F. SKERL.
TICKET MACHINE.
APPLICATION FILED NOV. 29, 1915.

1,313,958.

Patented Aug. 26, 1919.
9 SHEETS—SHEET 6.

Inventor
FRANCESCO SKERL
by R. C. Vass
Carl Benst
Attorneys

F. SKERL.
TICKET MACHINE.
APPLICATION FILED NOV. 29, 1915.

1,313,958.

Patented Aug. 26, 1919
9 SHEETS—SHEET 7

Inventor
FRANCESCO SKERL

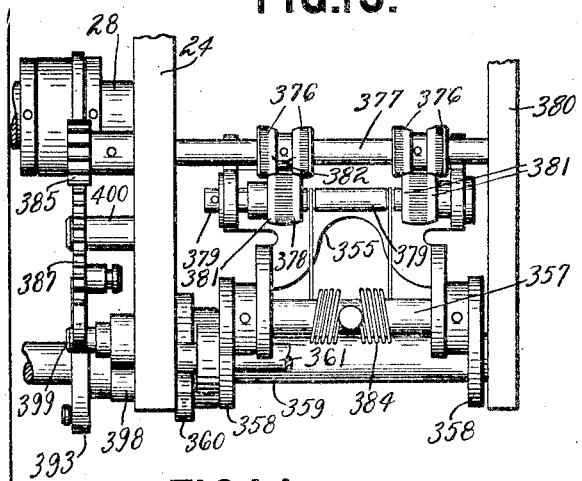
FIG.13.
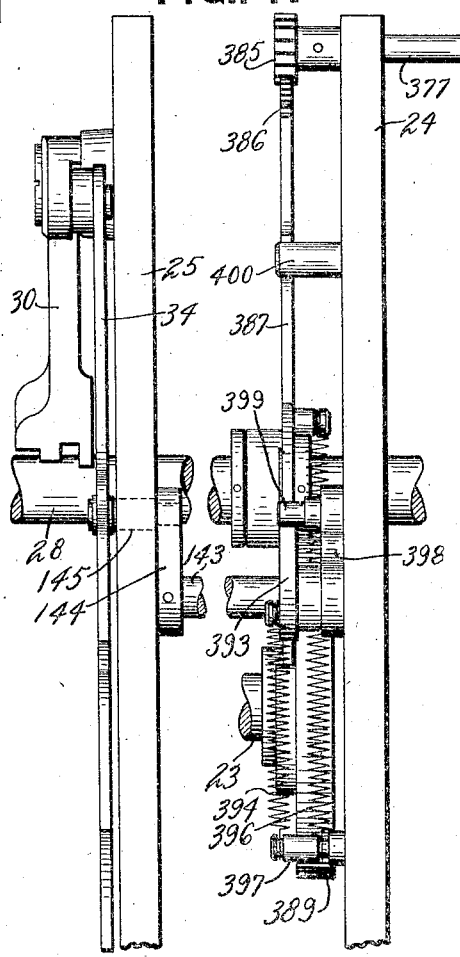
FIG.14.
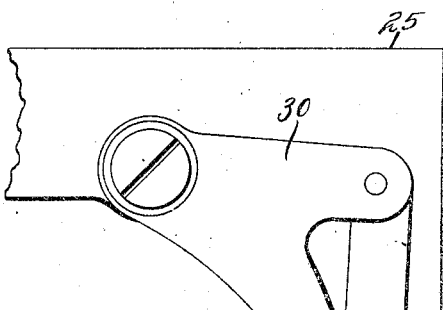
FIG.15.
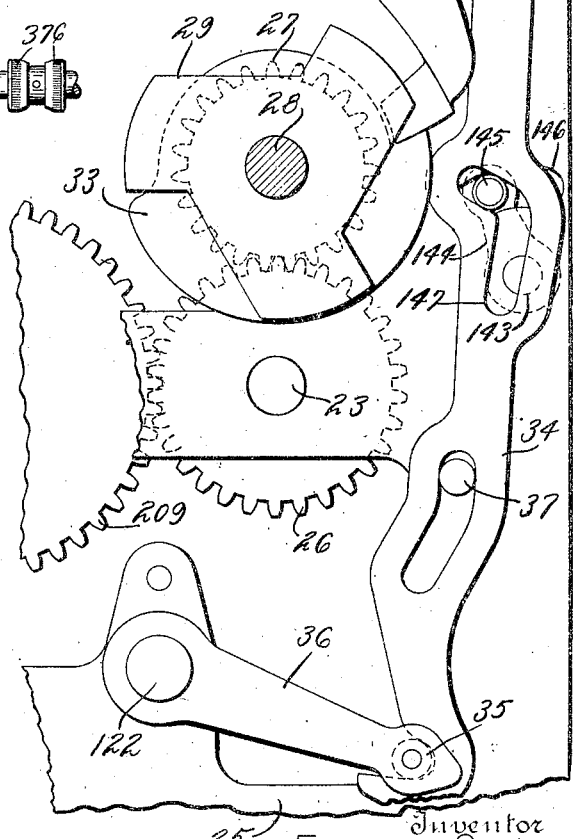
Inventor
FRANCESCO SKERL

F. SKERL.
TICKET MACHINE.
APPLICATION FILED NOV. 29, 1915.

1,313,958.

Patented Aug. 26, 1919.
9 SHEETS—SHEET 9.

Inventor
FRANCESCO SKERL
by R. Chlass
Carl Bennet
Attorney

UNITED STATES PATENT OFFICE.

FRANCESCO SKERL, OF DAYTON, OHIO, ASSIGNOR TO THE NATIONAL CASH REGISTER COMPANY, OF DAYTON, OHIO.

TICKET-MACHINE.

1,313,958.  Specification of Letters Patent.  Patented Aug. 26, 1919.

Application filed November 29, 1915. Serial No. 64,067.

*To all whom it may concern:*

Be it known that I, FRANCESCO SKERL, a citizen of Austria, residing at Dayton, in the county of Montgomery and State of Ohio, have invented certain new and useful Improvements in Ticket-Machines, of which I declare the following to be a full, clear, and exact description.

This invention relates to ticket issuing machines and more particularly to that class adapted to issue one or more tickets or checks of various denominations at one operation of the machine.

Certain of the structures shown and described herein are not claimed in the present application but form the subject matter of certain divisional applications.

One of the principal objects of this invention is to provide a novel form of ticket or check ejecting device. In the preferred form of embodiment disclosed herein, this device is constructed to eject a varying number of tickets which have been printed and severed from a ticket strip during the operation of the machine. The tickets are successively fed into position to be severed from a ticket strip and then near the end of the operation of the machine the ejecting device is operated to feed all of the severed tickets into position to be withdrawn from the machine.

The machine as illustrated also provides totalizing mechanism for accumulating the total value of tickets of various denominations as they are issued with means for disabling the totalizing mechanism when tickets of a certain denomination are issued. In the mechanism to which the present invention is shown applied the actuating mechanism is constructed to be given various extents of movement dependent upon the value or denomination of the tickets to be issued. However, this mechanism is not designed to be given extents of movements commensurate with values or denominations greater than a predetermined value. Therefore, when tickets of greater value than the predetermined value are issued the totalizing mechanism is disabled.

With these and incidental objects in view the invention consists in certain novel features of construction and combinations of parts, the essential elements of which are set forth in the appended claims and a preferred form of embodiment of which is hereinafter described with reference to the drawings which accompany and form part of this specification.

Of said drawings:

Fig. 3 is a detail transverse vertical section taken along the bank of denomination keys to show the mechanism for controlling the variable operation of the machine.

Fig. 4 is a detail view of the cam for operating certain parts of the mechanism shown in Fig. 3.

Figure 5:
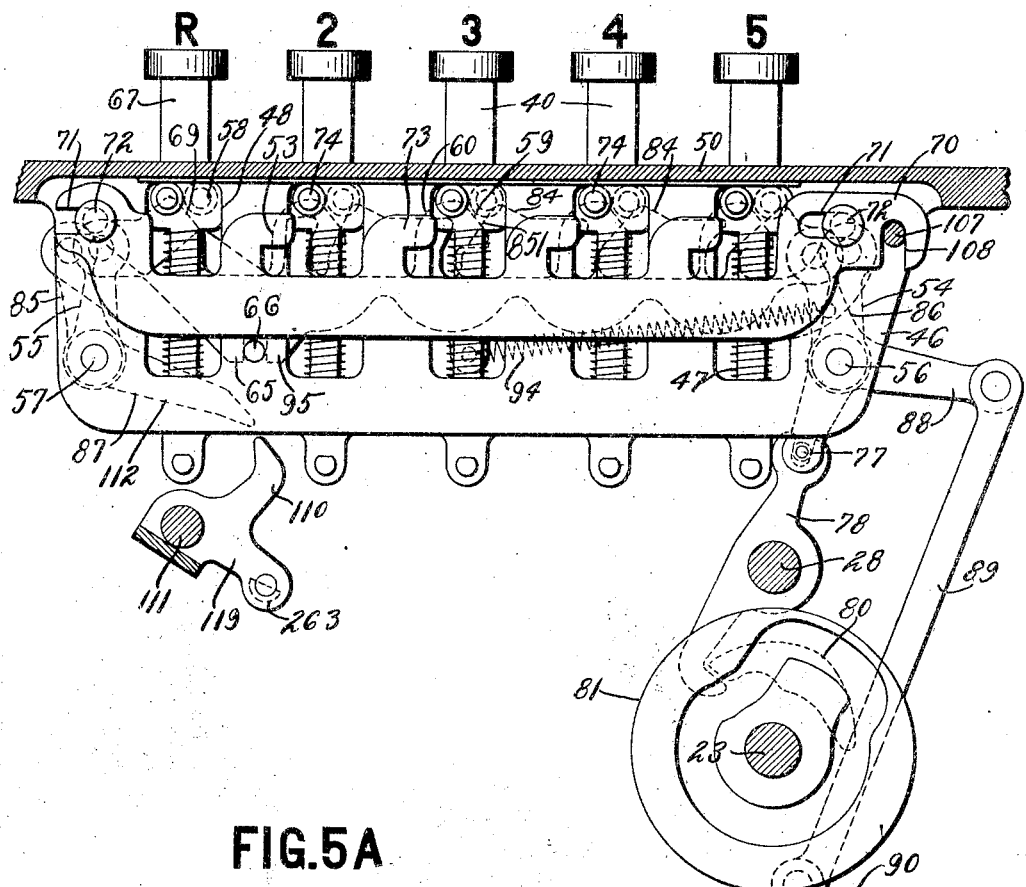
Fig. 5 is a detail transverse vertical section taken along the side of the bank of ticket keys as on the line A—A in Fig. 1 and looking in the direction of the arrows.

Fig. 5^A is a detail view of the means for locking the machine against operation during times at which the machine is not to be operated.

Figure 6:
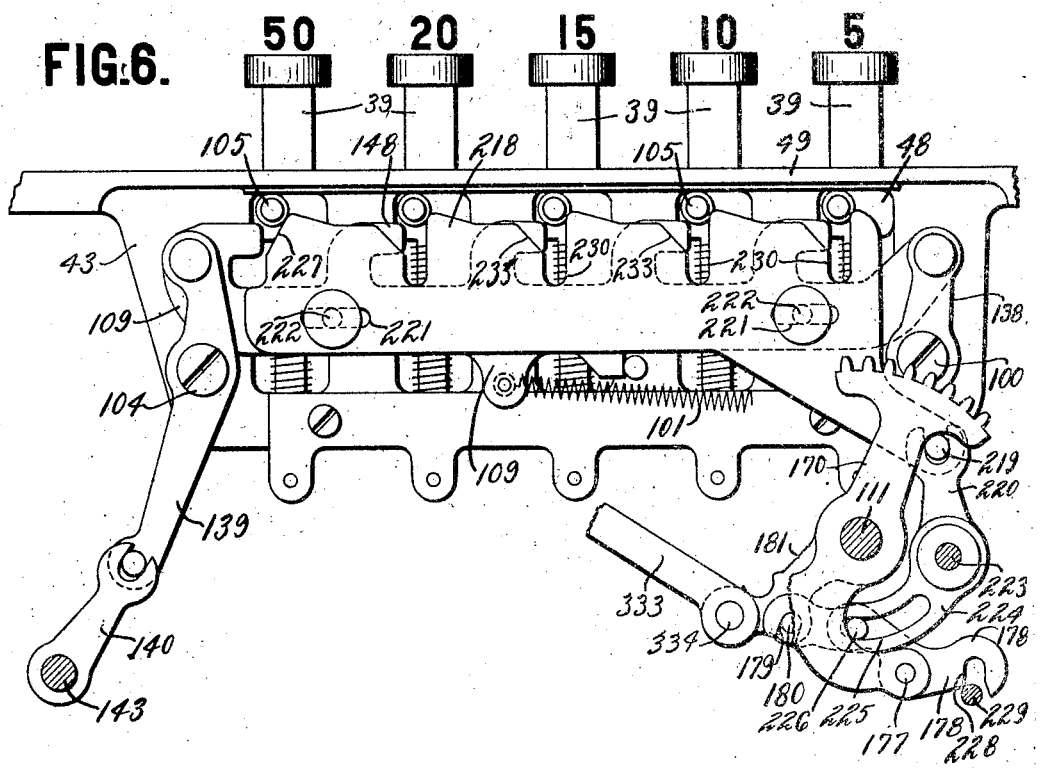

Fig. 6 is a detail sectional view taken along the left hand side of the bank of denomination keys and looking toward the right. This view also shows the actuator and connections for the totalizing mechanism.

Figure 7:
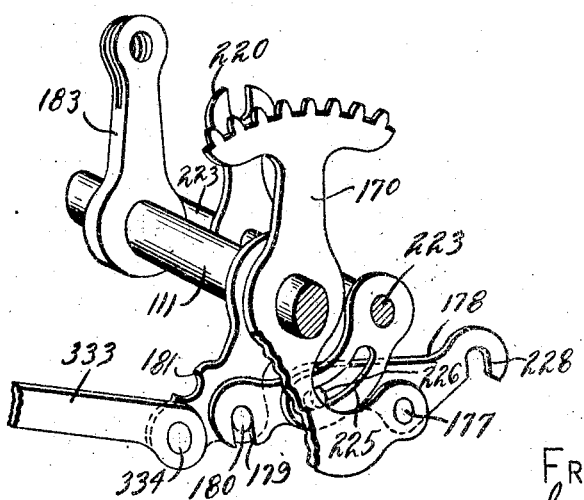

Fig. 7 is a detail perspective view showing the actuator for the totalizing mechanism and part of the disabling means therefor.

Figure 1:
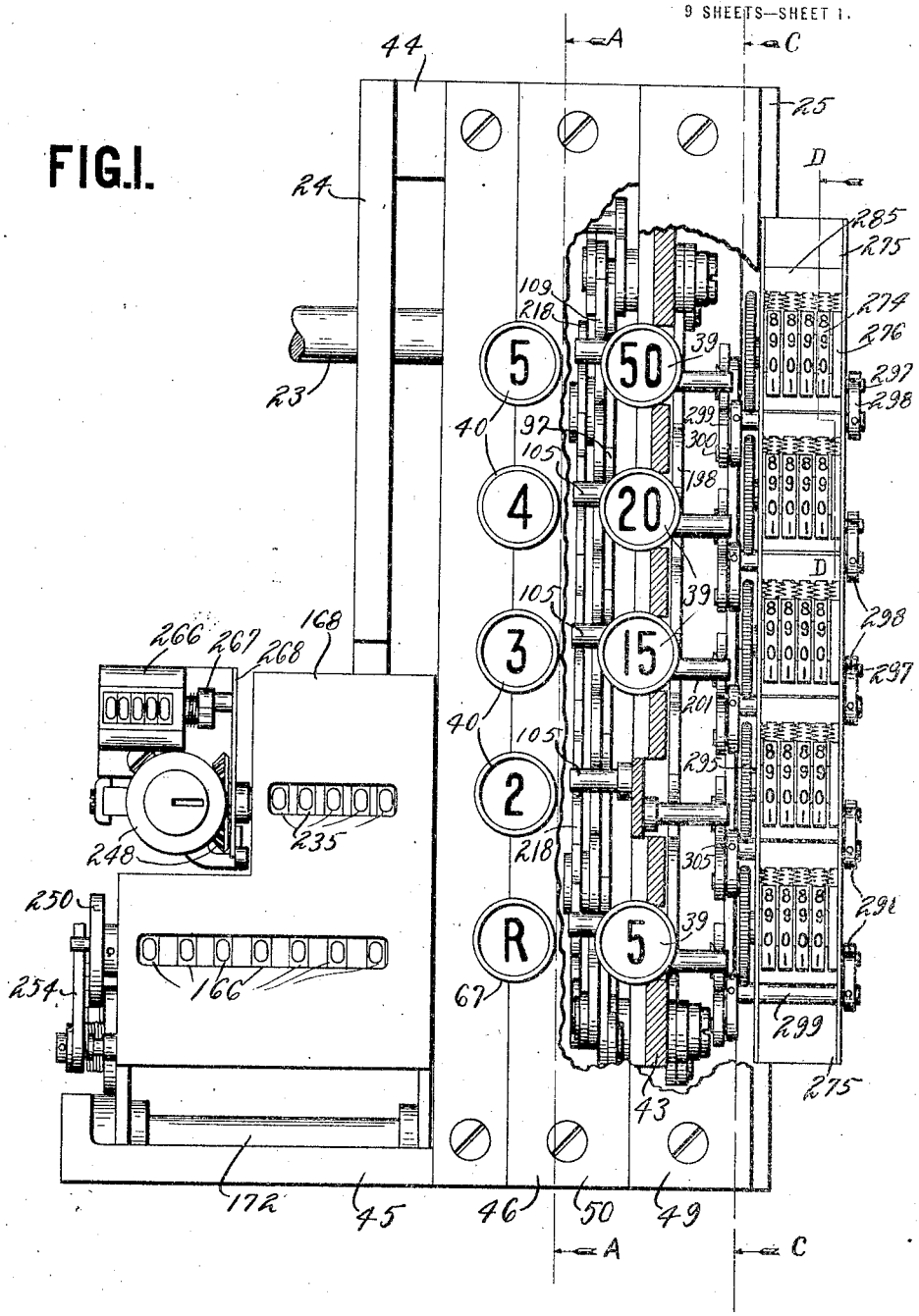
Figure 1 is a top plan view of the machine constructed in accordance to the invention shown herein. In this figure the cabinet of the machine, the printing mechanism and the electric motor are omitted and part of the key frames are broken away to expose the devices operated by the denominations keys, to view.
Figure 8:
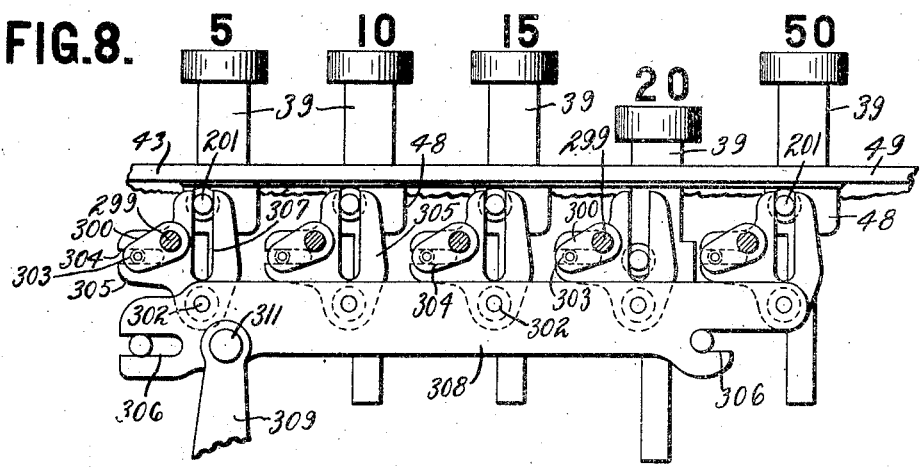

Fig. 8 is a detail transverse vertical section taken on the line C—C of Fig. 1 and looking in the direction of arrows to show part of the operating means for the ticket counters.

Figure 9:
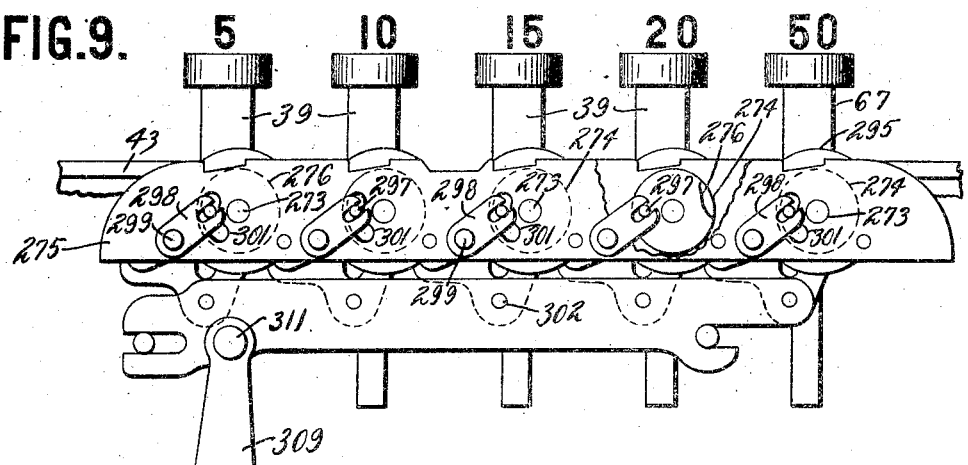

Fig. 9 is a detail right hand side view of the ticket counters and the operating means therefor.

Figure 10:
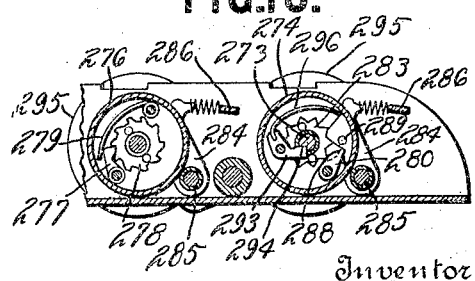

Fig. 10 is a detail sectional view taken through two of the ticket counters as on the line D—D of Fig. 1 and looking in the direction of the arrow.

Figure 11:
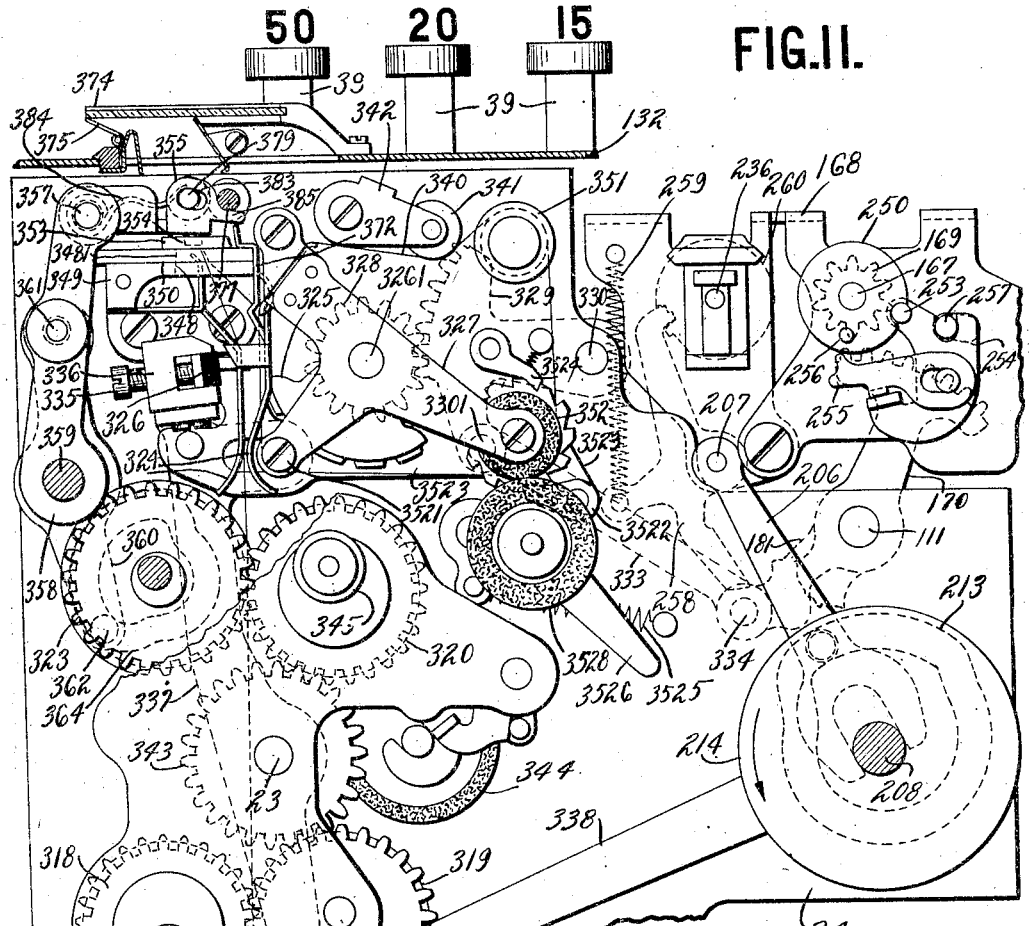

Fig. 11 is a left hand side view of the machine and shows the printing and totalizing mechanisms.

Figure 12:
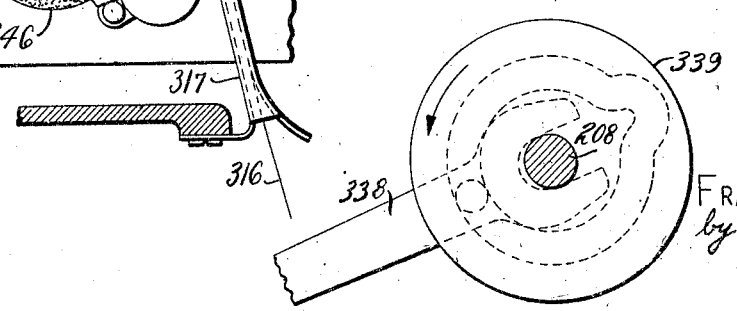

Fig. 12 is a detail view showing the cam and part of the pitman for operating the platen.

Fig. 13 is a detail top plan view of the ticket ejecting mechanism.

Fig. 14 is a detail rear view partly broken away of the means for operating the check ejecting mechanism.

Fig. 15 is a detail partial right hand side view of the machine with the motor omitted and showing the motor locking device.

Figure 16:
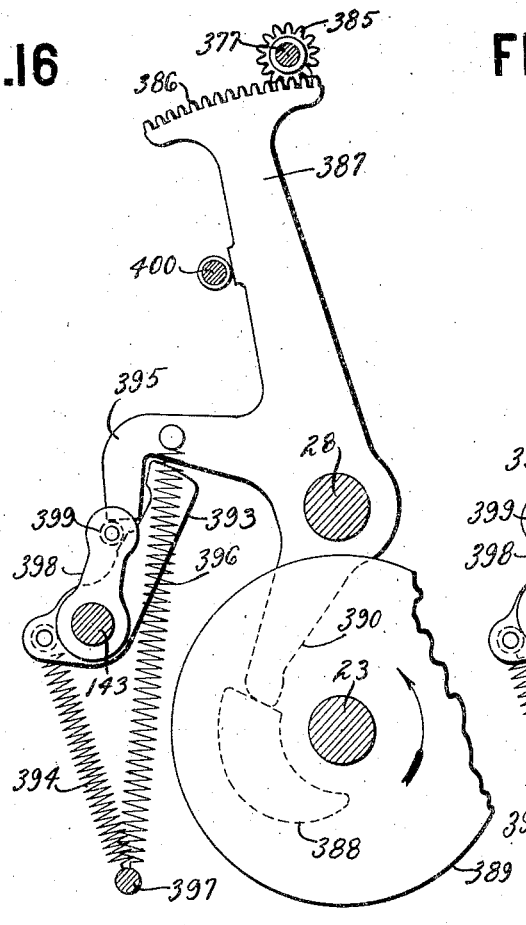
Figure 17:
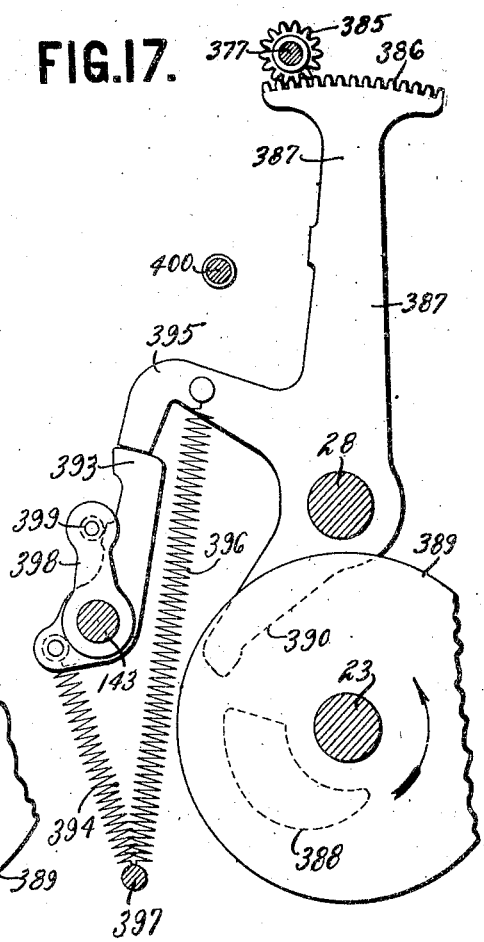

Figs. 16 and 17 are detail side views taken along the side of the operating means for the check ejecting mechanism. Fig. 16 shows this means in normal position and Fig. 17 shows the same in moved position.

Figure 18:
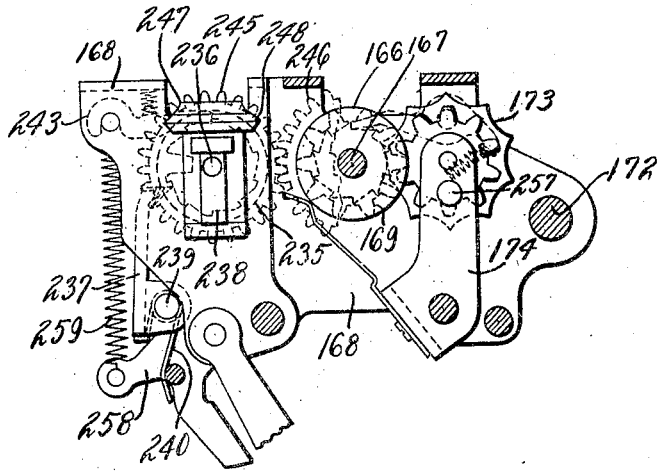

Fig. 18 is a detail sectional view showing the totalizing mechanism for accumulating the total value of issued tickets of certain denominations, and the total counter for registering the total number of issued tickets of all denominations.

The present invention is shown applied to a type of machine well known on the market and fully shown and described in the copending application for Letters Patent of the United States, Serial No. 802,101, filed by Francesco Skerl, on Nov. 20, 1913. It is to be understood, however, that the present invention is readily applicable to other types of machines and it is not intended to limit the invention to use with the particular embodiment disclosed herein.

In general the machine is provided with a bank of amount keys for determining the value or denominations of tickets to be issued and a bank of number or ticket keys for determining the number of tickets to be issued at a single operation of the machine. The ticket key representing the number of tickets to be issued is first depressed when the machine is to be operated and then the desired denomination key is operated. The depression of the desired ticket key differentially positions means, which when the desired denomination key is depressed, limits the extent of movement of a device for controlling the number of operations of the machine, there being one ticket issued upon each cycle of operation of the latter.

The amount keys also operate means for controlling the extent of movement of the totalizer actuating mechanism during the operation of the machine. The machine in the preferred form of embodiment is shown as adapted to issue tickets of five different denominations namely 5¢, 10¢, 15¢, 20¢ and 50¢ tickets. It is, of course, to be understood that a machine can be constructed in accordance with the present invention to issue tickets of any desired denominations, without departing from the scope of the present invention, the denominations of the tickets shown in the drawings being merely for illustrative purposes. When the 50¢ denomination key is operated it automatically disconnects the actuating member for the totalizer from the operating device for the actuating member. When, however, one of the other amount keys is depressed the actuating means is actuated accordingly to add the value of the ticket or tickets issued on the totalizer.

Upon each cycle of operation of the machine the printing mechanism prints a ticket upon a ticket strip and severs the printed ticket from the strip. Near the end of the variable operation of the machine, coöperating feeding members of the ejecting device are moved into coöperative relation and then operated to eject the printed and severed tickets into position to be withdrawn from the machine.

Operating mechanism.

The above description briefly points out the general features of the machine. The details appear from the drawings wherein 23 is the main drive shaft (Figs. 1, 11 and 15). The shaft is journaled in side frames 24 and 25 of the machine. Rigidly mounted on the shaft 23 is a gear 26 (Fig. 15) which meshes with a gear 27 having half as many teeth and rigidly mounted on a shaft 28 journaled in the frames 24 and 25. Also rigidly mounted on the shaft 28 is a clutch member 29 of the electric motor (not shown) employed to operate the machine. Only part of the clutch connections for the motor is shown in the drawings it being considered sufficient to state in the present case that a locking arm 30 normally engages a shoulder on a disk 33 loose on the shaft 28 and that movement of a locking arm 30 from normal locking position permits operation of the disk 33 to connect the clutch member 29 with a clutch member (not shown) operatively connected to the armature of the motor. If a more detailed description of the motor and the clutch mechanism for the motor is desired reference may be had to Letters Patent of the United States, No. 923,857, granted June 8, 1909 upon application filed by Charles F. Kettering and also to Letters Patent of the United States No. 1,144,418 granted June 29, 1915 to Charles F. Kettering and Wm. A. Chryst.

The motor locking arm 30 (Fig. 15) is pivotally connected to the upper end of a link 34 which at its lower end is provided with a notch into which a pin 35 carried by an arm 36 projects. When the machine is to be set in operation the arm 36 is rocked counter clockwise as viewed in Fig. 15 to raise the pin 35 and link 34, thereby moving the motor locking arm 30 out of locking position so that the motor clutch is rendered effective and the motor circuit is closed. The means for rocking the arm 36 to effect the unlocking of the machine will be described later. A stud 37 projecting from the side frame 25 of the machine extends into a slot in the link 34 to guide the link in its movements and thereby prevent the notch in the lower end of the link 34 becoming disengaged from the pin 35.

Keyboard.

A row or bank of amount or denomination keys 39 (Figs. 1, 2 and 3) is provided to determine the denomination of the ticket or tickets to be issued at each operation of the machine, and a row or bank of ticket keys 40 (Figs. 1 and 5) is provided to determine the number of tickets to be issued during a single operation of the machine. The denomination keys 39 are slidably mounted in a frame 43 supported by a rear frame 44 and a front 45 (Fig. 1) of the machine. The ticket keys 40 are slidably mounted in like manner in a similar key frame 46 which is also supported on the frames 44 and 45. Springs 47, (Figs. 2 and 5) which are coiled about the key shanks of the denomination and the ticket keys and compressed between shoulders 48 on the keys and the lower portions of the key frames, serve to retain the keys in normal undepressed positions and to return the depressed keys to such positions near the end of the operation of the machine. The shoulders 48 on the keys normally engage the under surfaces of top plates 49 and 50 of the frames 43 and 46 respectively to limit the extent of outward movement of the keys.

When but one ticket is to be issued during an operation of the machine a ticket key 40 is not depressed it being sufficient to depress the desired denomination key 39 to effect the operation of the machine. When more than one ticket is to be issued, however, the ticket key representing the number of tickets to be issued is first depressed and then the desired denomination key is depressed to release the machine.

As the denomination keys serve to effect the release of the machine it is desirable to provide detent 53 (Fig. 5) for retaining the operated ticket key in depressed position until an amount key is depressed, when a locking plate, to be described later, is operated to retain the operated ticket key in depressed position until near the end of the operation of the machine. The mechanism about to be described is shown and described in detail in the hereinbefore mentioned co-pending application of the present applicant and is therefore not shown in detail herein. The detent 53 is pivotally supported at its forward end by the upper end of an arm 55 and at its rear end by the upper end of a lever 54. The lever 54 and arm 55 are loosely mounted upon studs 56 and 57 respectively projecting from the key frame 46. Pins 58 projecting from the left hand sides of the shoulders 48 of the ticket keys 40 engage inclined edges 59 of the locking hooks or projections 60 on the detent 53. Depression of a ticket key through the engagement of its pin 58 with the corresponding inclined edge 59 moves the detent forwardly until the pin 58 on the depressed key passes out of engagement with the inclined edge 59 whereupon a spring (not shown) draws the detent rearward to normal position, so that the projection 60 passes over the pin 58 on the depressed ticket key and retains the latter in depressed position. The rearward movement of the detent 53 to normal position is limited by the engagement of a projection 65 on its lower edge with a pin 66 projecting from the key frame 46.

If it is desired to move the detent 53 forwardly preliminarily to the operation of the machine to release the operated ticket key, as for example when the wrong ticket key is operated, a release key 67, which is the foremost key in the bank of ticket keys, is depressed before the desired denomination key is operated. Upon such depression of the release key its pin 58 engages an inclined edge 69 (Fig. 5) on the detent 53 thereby moving latter forwardly so that the projection 60 on the detent is carried away from over the pin 58 on the depressed ticket key to permit the spring 47 for the latter to restore it to normal position.

When a denomination key is operated, a locking plate 70 (Fig. 5) for the bank of ticket keys is operated, through means to be described later, for the purpose of locking the operated ticket key in depressed position until near the end of the operation of the machine. This locking plate 70 is slidably mounted on the right hand side of the key frame 46, the locking plate being provided with slots 71 through which pins 72 on the key frame 46 project. This locking plate 70 has locking projections 73 which are so constructed that, when the locking plate is drawn rearwardly upon depression of a denomination key one of the projections engages over the pin 74 projecting from the right hand side of the shoulder 48 of the operated ticket key to lock the latter in operated position until near the end of the operation of the machine. The projections 73 for the undepressed keys move under the pins 74 on these keys to lock them against depression during the operation of the machine. Near the end of the operation of the machine the locking plate 70 is slid forwardly to normal position to release the operated ticket key whereupon the spring 47 for the key restores the latter to normal undepressed position.

In order to permit the restoration of the operated ticket key near the end of the operation of the machine it is necessary to move the detent 53 (Fig. 5) forwardly and this is done as each ticket is issued so after a variable number of tickets have been issued the operated ticket key can be restored to undepressed position, when the locking plate 70 is returned to normal position as above stated. To operate the detent 53 in this manner the lower end of the lever 54 carries a pin 77 projecting into a recess in the upper end of a lever 78 loosely mounted on the shaft 28. When the detent 53 is in normal position the lower end of the lever 78 is in the path of movement of a cam block 80 mounted on the side of a disk 81 fast on the main drive shaft 23. Near the end of each cycle of operation of the machine the cam block 80 engages the lower end of the lever 78 thereby rocking the lever 78 clockwise and the lever 54 counter clockwise (Fig. 5) to move the detent 53 forwardly. Near the end of the last cycle of operation of the machine and at same time that the detent 53 is moved forwardly the locking plate 70 is moved to normal unlocking position so that the spring 47 for the operated ticket key may then restore the latter to normal undepressed position.

For the purpose of determining the number of tickets to be issued at a single operation of the main operating mechanism the bank of ticket keys is provided with a movable plate 84 (Fig. 5) pivotally carried by its forward and rear ends respectively by upwardly extending arms 85 and 86 of levers 87 and 88 respectively mounted on the pins 57 and 56 respectively on the key frame 46. The pins 58 on the ticket keys 39 coöperate with differentially inclined slots 851 in the plate 84. When a ticket key is depressed it moves the plate 84 differentially and rearwardly by the coöperation of its pin 58 with the inclined slot 851 under the pin thereby swinging the bell crank levers 87 and 88 differentially in a clockwise direction (Fig. 5) about their pivotal centers. The nearly horizontal arm of the lever 88 is connected to the upper end of a link 89 which at its lower end is pivotally connected to a lever 90 loosely mounted on a cross rod 93. When the bell crank lever 88 is rocked differentially as above described, the lever 90 is rocked differentially in a counter clockwise direction (Fig. 5) through the link 89 and the position of this lever 90 then determines the number of cycles of operation of the machine as will be described later. When the depressed ticket key is restored to normal position near the end of the operation of the machine a spring 94 connected at its forward end to the key frame 46 and at its rear end to the lever 88 restores the plate 84 and hence the lever 90 to normal position. A projection 95 on the lower end of the plate 84 normally engages the pin 66 on the key frame 46 to prevent movement of the plate past normal position.

A complete depression of a denomination key 39 operates the locking plate 70 (Fig. 5) for the ticket keys and the motor locking arm 30 (Fig. 15) and the means by which these results are accomplished will now be described. A plate 97 (Fig. 3) is pivotally mounted at its forward end on a vertical arm 98 of a lever 99 loosely mounted on a stud 100 projecting from the key frame 43. At its rear end the plate 97 is pivotally mounted on the vertical arm of a lever 103 loosely mounted on a stud 104 also projecting from the key frame 43. When a denomination key is depressed a pin 105 which projects from the left hand side of the shoulder 58 of the key engages in the corresponding inclined slot 106 formed in the plate 97, and moves the plate rearwardly, thereby swinging the levers 99 and 103 about their pivots. The slots 106 are of the same inclination so that when a denomination key is depressed the plate 97 is swung rearwardly an invariable distance against the influence of a spring 101 connected at its forward end to the lever 99 and at its rear end to a pin on a locking plate 109 to be described later. A projection 96 on the lower edge of the plate 97 normally engages a stud 102 on the key frame 43 to prevent forward movement of the plate 97 past normal position. The vertical arm of the lever 103 carries a pin 107 which projects into a slot 108 (Fig. 5) formed in the locking plate 70 for the ticket keys. It can therefore be seen that when the plate 97 is moved rearwardly by the depression of a denomination key the locking plate 70 is drawn rearwardly to lock the depressed ticket key in depressed position.

In order to prevent depression of a ticket key after a denomination key has been depressed partially, an arm 110 of a yoke member 119 loose on a shaft 111 is moved under the arm 112 (Fig. 5) of the lever 87 by the depressed denomination key, thereby preventing rearward movement of the plate 84 and hence depression of a ticket key. The right side of the yoke member 119 (Fig. 3) carries a pin 120 projecting into a recess in the lever 99 so that when a denomination key is depressed the yoke member 119 is rocked counter clockwise (Figs. 3 and 5) to carry its arm 110 under the arm 112 of the lever 87.

A link 113 (Fig. 3) is pivotally connected at its upper end to the nearly horizontal arm of the lever 103. At its lower end this link 113 is provided with a slot 114 into which a pin projecting from the forwardly extending arm of a lever 115 projects. The downwardly extending arm of the lever 115, which is loosely mounted on the cross rod 93 is provided with a stud 116 which is normally in engagement with the uppermost one of a series of teeth 117 formed on the rear end of a lever 118. The lever 118 is rigidly mounted on a shaft 122 suitably supported at its ends in the side frames 24 and 25 of the machine. A lever 123 is loosely mounted on the forwardly extending arm of the lever 115 by the pin which projects into the slot 114. This lever 123 near its upper end has two shoulders 124 the upper one of which is normally under and in engagement with a stud 125 projecting laterally from the middle of the link 113. The lever 123 is normally held in this position by a spring 126 which is connected at its forward end to the lower end of the lever 123 and at its rear end to the lever 115. When a denomination key is depressed the clockwise movement of the lever 103 lowers the link 113, and as the lever 123 forms a positive connection between the link 113 and the lever 115 the latter is rocked counter clockwise, as viewed in Fig. 3, to carry the stud 116 out of engagement with the uppermost tooth 117 on the lever 118. When the stud 116 is moved out of engagement in this manner with the lever 118 the latter with the shaft 122 is rocked counter clockwise as viewed in Figs. 2 and 3 by a spring 127 (Fig. 2) which is coiled about the shaft 122 and bent at one end about a stud 128 projecting from the right hand side frame 25 of the machine, the other end being bent about a laterally projecting lug on an arm 121 which is also rigidly mounted on the shaft 122. Rigidly mounted on the shaft 122 is a stepped plate 129 (Fig. 5) which is normally so positioned that a plate 130 fast on the downwardly extending arm of the lever 90 is one step of movement above the uppermost step 133 on the arm 129.

It can be seen from the above description that if a ticket key has not been depressed the lever 90 is not rocked out of normal position and therefore when the lever 118, shaft 122 and arm 129 are rocked by the coiled spring 127 upon depression of a denomination key this lever, shaft and arm are only rocked one step, the movement of these members being limited by the engagement of the uppermost step 133 with the plate 130. If, however, a ticket key is depressed the plate 130 on the lever 90 is moved differentially away from the arm 129 so that when a denomination key is then depressed the shaft 122 and therefore of the lever 118 and arm 129 are moved differentially in accordance with the movement of the plate 130 their extent of movement being limited by the engagement of one of the steps 133 on the arm 129 with the differentially positioned plate 130. The arm 36 (Fig. 15) is rigidly mounted on the shaft 122 and it is therefore evident that when the shaft 122 is rocked differentially from normal position the arm 36 will be given a like extent of movement, and through the link 34 raise the motor locking arm 30 differentially and out of engagement with the clutch connections of the motor to permit the operation of the machine.

Elevation of the link 34 (Fig. 15) when the machine is released effects operation of the locking plate 109 (Fig. 6) for the denomination keys. This locking plate 109 at its forward end is supported by an arm 138 pivoted on the stud 100 and at its rear end by a lever 139 pivoted on the stud 104. The lower end of the lever 139 carries a pin projecting into the bifurcated end of an arm 140 rigidly mounted on a shaft 143 which is journaled in the side frames of the machine. Also rigidly mounted on the shaft 143 is an arm 144 (Fig. 15) which carries a roller 145 projecting through a slot 146 in the frame 25 and through an angular slot 147 in the link 34. The slot 146 is concentric with the shaft 143 to permit oscillation of the arm 144 and the shaft 143. The slot 147 is so constructed that when the link 34 is raised one or more steps, as above described, the arm 144 and shaft 143 are rocked clockwise as viewed in Fig. 15, an invariable distance to rock the arm 140 counter clockwise as viewed in Fig. 6. Such movement of the arm 140 rocks the lever 139 clockwise (Fig. 6) thereby moving the locking plate 109 forwardly. Such movement of the locking plate 109 carries one of its projections 148 over the pin 105 on the depressed denomination key to lock it in depressed position while the other projections are carried under the pins 105 on the undepressed keys to lock the latter against depression. Near the end of the last cycle of operation of the machine the link 34 is restored to normal position as will be described presently, thereby moving the locking plate 109 out of locking position whereupon the depressed denomination key is restored to normal position by its spring.

Means are provided for locking the machine against operation when the machine is not to be used. This means comprises a lock 131 (Fig. 5ᴬ) mounted on the cabinet 132 of the machine. The key barrel 142 of the lock carries a member 135 provided with a pin 136 which projects into a slot formed in a lever 141. The lever 141 is centrally pivoted on the cabinet of the machine and its arm 151 projects over the forwardly extending arm of the lever 99 (Fig. 5ᴬ). When a key is inserted into the barrel 142 and turned clockwise (Fig. 5ᴬ) to lock the machine the lever 141 is rocked clockwise to move its arm 151 into engagement with the forwardly extending arm of the lever 99 whereby the operation of the plate 97 and hence operation of the machine is prevented.

Means for restoring motor locking means to normal position.

Upon each cycle of operation of the machine, that is, upon each complete rotation of the main drive shaft 23, a ticket is issued and the motor locking arm 30 (Fig. 15) is returned one step toward normal locking position. The mechanism by which this locking arm is restored to normal position is fully shown and described in the aforesaid co-pending application, and will be described but briefly here.

A bell crank lever 149 (Fig. 3), loosely mounted on the shaft 122, carries at the upper end of its vertically extending arm a roller projecting into a cam groove formed in the face of the disk 81 rigidly mounted on the drive shaft 23. The forwardly extending arm of the lever 149 carries a centrally pivoted lever 150, which at its lower end carries a pin projecting into a cam slot 153 formed in the forwardly and downwardly extending arm of a lever 154 also loosely mounted on the shaft 122. The vertical arm of the lever 154 carries a roller (Fig. 4) projecting into a cam groove formed in the face of a disk 155 which is fast on the drive shaft 23.

During the rotation of the main drive shaft 23, the levers 149 and 154 are rocked counter clockwise, (Fig. 3), as a unit by their respective cam grooves (Figs. 3 and 4). The lever 154 is then rocked slightly clockwise relative to the lever 149 so that the lever 150 is rocked clockwise about its pivot through the slot and pin connection 153 to carry a stud on its upper end into engagement with the lower face of a tooth 156 which is opposite the stud at that time, a series of these teeth being formed on the forward end of the lever 118. The levers 149 and 154 are then rocked clockwise as a unit and as the stud on the lever 150 is in engagement with one of the teeth 156 the lever 118, shaft 122, arm 36 (Fig. 15) link 34, and motor locking arm 30 are returned one step toward normal position. Near the very end of a cycle of operation the lever 154 is rocked slightly counter clockwise (Fig. 3) relative to the lever 149 so that the lever 150 is rocked counter clockwise to carry the stud on the latter out of engagement with the tooth 156.

Simultaneously with the rocking of the lever 150 so that its stud is taken out of engagement with the tooth 156 the lever 115 is rocked so that the stud 116 on the lever 115 is carried into engagement with the upper face of the tooth 117 which is opposite the stud at the time in order to retain the lever 118 and associated parts in the position into which they were moved by the levers 149 and 154 until the stud on the lever 150 is moved under the next tooth 156 during the next cycle of operation. To accomplish this purpose a stud 159 (Fig. 2) projecting from the disk 134 engages the upper end of the lever 123 thereby rocking the latter to carry its upper shoulder 124 out of engagement with the stud 125 on the link 113. The spring 126 immediately rocks the lever 115 clockwise to carry the stud 116 into engagement with one of the teeth 117. To insure positive movement of the lever 115 the vertical arm of the lever 115 has a nose which is engaged by the stud 159 to rock the lever 115 if this has not already been accomplished by the spring 126. Upon each cycle of operation of the machine the levers 149 and 154 are operated as above described thereby moving the lever 118 and hence the motor locking arm 30 one step toward normal position. Upon each return movement of the lever 118 toward normal position after this lever has been moved the first step toward normal position the lever 115 is rocked counter clockwise as viewed in Fig. 3 by the engagement of the stud 116 with the lower cam edge of the tooth 118 above the tooth engaged by the stud 116 at the end of the previous cycle of operation, and after this stud passes out of engagement with this cam edge of the tooth a lever 115 is again rocked by its spring 126 or the stud 159 so that the stud 116 is carried into engagement with the upper face of this tooth. Upon the last step of return movement of the locking arm 30 to normal position the motor clutch is disconnected, the motor circuit broken and the machine locked against further operation until a denomination key is again depressed.

During the last cycle of operation of the machine the locking plate 109 (Figs. 3 and 6) for the amount keys is moved to normal unlocking position as above described whereupon the denomination key is restored to normal position. As this key is restored to normal position the spring 101 (Fig. 3) moves the plate 97 and hence the locking plate 70 (Fig. 5) for the ticket keys to normal position whereupon the depressed ticket key is restored to normal position.

Totalizing mechanism.

The mechanism for accumulating the total value of the 5, 10, 15 and 20 cent tickets issued by the machine comprises a plurality of registering wheels 166 (Figs. 1 and 18) loosely mounted on a shaft 167 which is supported in a rock frame 168. The frame 168 is loosely mounted on a cross rod 172 supported in the front frame 45 of the machine. A pinion 169 rigid with the wheel of lowest denomination is actuated directly by the teeth on an actuator 170 (Figs. 6, 7 and 11), loosely mounted on the shaft 111. The periphery of this wheel of lowest denomination is provided with alternating "0"s and "5"s and is constructed to transfer to the wheel of next higher order at each second step of movement, the wheels of higher order transferring at each complete rotation. The carrying operations from wheels of lower denominations to wheels of higher denominations are accomplished by the well known Geneva stop mechanism (Fig. 18) which comprises transfer wheels 173 carried by a frame 174 pivotally mounted within the totalizer frame 168.

The totalizer actuator 170 (Figs. 6 and 7) pivotally carries at 177 a lever 178 which at its forward end is provided with a recess 179 engaging over a pin 180 projecting from an arm 181, which is rigidly mounted on the shaft 111. Also rigidly mounted on the shaft 111 is an arm 183 (Figs. 2 and 7) which at its upper end is pivotally connected to the forward end of the link 184. The rear end of the link 184 is pivotally connected to the upper end of a lever 185 which at its lower end is pivotally connected to a pitman 186. This pitman 186 is forked at both ends and the forward end straddles a stud 187 and the rear end straddles the drive shaft 23. The pitman 186, near its rear end, carries a roller projecting into the cam groove formed in the face of the disk 134. A vertical bar 188 is slidably mounted on the stud 187 and a stud 189 which project through corresponding slots 190 in the bar 188. A roller 191 projecting from a rearwardly extending projection on the bar 188 projects into a slot 193 formed in the lever 185. A lever 194 is loosely mounted on the shaft 111 and its rearwardly extending arm is forked over a roller 195 projecting from a forwardly extending projection on the bar 188. The upwardly and forwardly extending arm of the lever 194 is forked over a pin 196 projecting from the lower end of an arm 197 loosely mounted at its upper end on the key frame 43. The arm 197 supports the forward end of a plate 198 which at its rear end is supported by an arm 199 also pivotally mounted at its upper end on the key frame 43.

When a denomination key is depressed its pin 201, projecting from its right hand side, coöperates with the corresponding slot 200 formed in the plate 198. These slots 200 are differentially inclined so that depression of the denomination keys will move the plate 198 rearwardly to different extents, thereby elevating the bar 188 differentially through the arm 197 and lever 194. A spring 203 connected at its rear end to the plate 198 and at its forward end to a pin on the key frame 43 restores the plate 198 and thereby the lever 194 and bar 188 to normal position near the end of the operation of the machine when the depressed denomination key is restored to normal position.

It can be seen that as the roller 191 is differentially positioned in the slot 193 the operation of the pitman 186 by the cam groove in the disk 134 rocks the shaft 111 and arm 181 differentially through the lever 185, link 184 and arm 183. As the arm 181 is connected to the actuator 170 (Figs. 6 and 7) by the lever 178 the actuator 170 will be moved to a like extent. Upon each reciprocation of the pitman 186 a projection 204 on the pitman engages in one of the notches 205 in the bar 188 to aline the latter in adjusted position during the movement of the actuator 170. The cam groove in the disk 134 for operating the pitman 186 is so constructed that the actuator 170 is moved differentially near the beginning of each cycle of operation of the machine and then near the end of the operation restored to normal position. During each cycle of operation and while the actuator is in moved position the totalizer frame 168 is rocked about the rod 172 to move the pinion 169 on the totalizer wheel of lowest denomination into engagement with the teeth on the actuator 170, and then after the actuator has been restored to normal position the totalizer frame is elevated to move this pinion out of engagement with the actuator.

The means for rocking the totalizer frame 168 is shown in Fig. 11. A pitman 206 is pivotally connected at its upper end by pin 207 to the totalizer frame 168 and its lower end is forked to straddle a shaft 208. The shaft 208 is given one complete rotation upon each complete rotation of the main drive shaft 23 through a large intermediate gear 209 (Figs. 2 and 15) which meshes with the gear 26 on the main drive shaft and also with a gear 210 rigidly mounted on the shaft 208. The pitman 206 carries a roller projecting into a cam groove 213 formed in a disk 214 rigidly mounted on the shaft 208. The cam groove 213 is so constructed that the totalizer frame is rocked upon each cycle of operation of the machine to engage the pinion 169 of the totalizer wheel of lowest denomination with the actuator 170 so that during a return movement of the latter at each cycle of operation the totalizer is operated to accumulate the total value of tickets issued.

The above described actuating mechanism for the totalizer is so constructed that it is not designed to be given ten steps of movement, which would be necessary to add the value of a fifty cent ticket on the totalizer. When the fifty cent key is depressed therefore this actuating mechanism is disabled and therefore the totalizer only accumulates the total value of 5, 10, 15 and 20 cent tickets.

It will be obvious from the following description that the disabling means for the totalizer actuating mechanism may be constructed to be disabled by depression of a key of any desired denomination or by any one of a plurality of the denomination keys without departing from the scope of the invention.

The means for disabling the actuating mechanism when the 50 cent key is depressed is shown in Figs. 6 and 7. A plate 218 is slidably mounted on the locking plate 109, the plate 218 being provided with slots 221 through which pins 222 on the locking plate 109 project. The forward end of the plate 218 carries a pin 219 which projects into the recess formed in the upper end of an arm 220 rigidly mounted on a shaft 223 supported in the side frames 24 and 25 of the machine. Also rigidly mounted on the shaft 223, is an arm 224 which is provided with a slot 225 through which a pin 226 on the lever 178 projects.

With the plate 218 in the position shown in Fig. 6, it can be seen that when the 50 cent key is depressed its pin 105 engages an inclined edge 227 on the plate 218 thereby moving the plate 218 forwardly and relative to the locking plate 109. Such movement of the plate 218 rocks the arm 220 and hence the shaft 223 and the arm 224 clockwise as viewed in Figs. 6 and 7. As the pin 226 on a lever 178 projects into the slot 225 in the arm 224 such movement of the arm 224 rocks the lever 178 to move its recess 179 out of engagement with the pin 180 in the arm 181. With the lever 178 in this position it can be seen that when the arm 181 is rocked differentially under the control of the 50 cent key as above described, the actuator 170 will not be moved, and therefore the totalizer when rocked into engagement with the actuator will not be operated. When the lever 178 is disconnected from the arm 181 a recess 228 in the rear end of the lever engages over a stationary stud 229 positively to lock the actuator 170 against operation. When the lever 178 is connected to the arm 181 the slot 225 in the arm 224 is concentric with the shaft 111 so that when the arm 181 and the actuator 170 are rocked the pin 226 moves in the slot 225 and positively retains the lever 178 in connection with the arm 181.

If a denomination key other than the 50 cent key is depressed when the plate 218 is in the position shown in Fig. 6, its pin 105 merely moves into engagement with the lower vertical portion of the corresponding slot 230 in the plate 218 without moving the plate. If, however, the plate has been moved forwardly at the next preceding operation by the 50 cent key the depression of one of the other denomination keys at the next operation moves the plate 218 rearwardly by engagement of the pin 105 on the key with the inclined edge 233 of the appropriate slot 230. It can therefore, be seen that when the 50 cent key is depressed the totalizer actuating mechanism is disabled if it has not already been disabled by depression of the 50 cent key at the next preceding operation and that the totalizer actuating mechanism is rendered effective by depression of one of the other denomination keys if it has not already been rendered effective by depression of one of these keys at the next preceding operation of the machine. As the pin 105 on the 50 cent key engages the rear end of the plate 218 below the inclined edge 227 when this key is depressed and as the pins 105 of the other denomination keys when depressed engage in the slots 230 the plate 218 and associated parts are positively held in one or the other of their positions during the operation of the machine.

Associated with the totalizer is a total ticket counter for registering the total number of all tickets issued by the machine. The registering wheels 235 (Figs. 1 and 18) of this counter are loosely mounted on a shaft 236 carried in the totalizer frame 168. These registering wheels are actuated by the engagement of graduated teeth arranged in a well known manner on the upper end of a pawl 237 with ratchet wheels 238 rigid with the registering wheels. This pawl 237 is loosely mounted on a stud 239 projecting from the left hand side frame 24, of the machine and a spring 240 serves to retain the teeth of the pawl in engagement with the ratchet wheels 238. Each time the totalizer frame 168 is rocked as above described, "1" is added to the previous amount on the counter by the engagement of the teeth of the pawl 237 with the ratchet wheels 238 as is well known in the art. Spring pressed retaining pawls 243 prevent retrograde movement of the registering wheels 235.

The device employed to turn the totalizer and the consecutive counter to zero is well known in the art and will be described but briefly here. In general this device consists of two intermeshing gears 245 and 246 (Fig. 18) fast to the right hand ends of the shafts 236 and 167 respectively, so that when a key is inserted into a lock 247 and turned the shaft 236 is rotated through two small bevel gears 248 (Fig. 1) on the key lock and the shaft 236 and the shaft 167 is rotated through the intermeshing gears 245 and 246. Interposed between the registering wheels of the totalizer and the counter and their respective shafts are pawls (not shown) suitably constructed to pick up the wheels at different points at which the wheels may be standing and turn them to zero as is well known in the art.

A disk 250 (Fig. 11) is fast on the shaft 167 and when this shaft is rotated to turn the totalizer wheels to zero a pin 253 on a lever 254 is forced out of engagement with a notch in the periphery of a disk 250 to move the rear end of an arm 255 in the path of movement of the pin 256 in the disk 250 to arrest the latter at the end of its rotation as is well known in the art. Such movement of the arm 254 through a pin 257 which is on the transfer frame 274 (Fig. 18) and engages in a recess (Fig. 11) in the arm 254, moves the transfer mechanism out of engagement with the totalizer wheel.

In order to prevent the registering wheels of the counter and totalizer from being turned to zero during an operation of the machine a lever 258 (Fig. 11) is pivotally mounted on the stud 207. The upper end of the vertically extending arm of the lever 258 is provided with shoulders which are normally retained by a spring 259 in engagement with notches formed in the periphery of a disk 260 fast on the counter shaft 336, to prevent backward rotation of the totalizer and counter shafts. The right hand side of the yoked member 119 (Figs. 3 and 5) carries a stud 263 which is normally out of the path of movement of the downwardly extending arm of the lever 258. When the yoked member 119 is rocked by the depression of one of the denomination keys, as above described, the stud 263 moves in front of and in the path of the downwardly extending arm of the lever 258, thereby locking the resetting mechanism against operation. During operation of the resetting mechanism the lower end of the downwardly extending arm of the lever 258 is over the stud 253, so that the yoked member 119 cannot be rocked and hence the denomination key cannot be depressed during this time.

As shown in Fig. 1 a consecutive counter 266, mounted on the totalizer frame, is employed to count the number of times the totalizer and the ticket counter are turned to zero. This counter 266 is omitted in Figs. 11 and 18 for the sake of clearness. This ticket counter is operated by the resetting mechanism through an arm 267 and a link 268, the link 268 being reciprocated by a pin and slot connection (not shown) with the bevel gear 248 on the counter shaft 236.

*Ticket counters.*

In addition to the totalizer and the total ticket counter above described a series of step by step counters (Figs. 1, 9 and 10) are provided, and these counters serve to register the number of tickets of each denomination issued. The shafts 273 upon which the counter wheels 274 of the ticket counters are loosely mounted are journaled in the sides of a frame 275 mounted on the side frame 25 of the machine. Each shaft 273 carries a disk 276 within which is mounted a pawl 277, (Fig. 10) coöperating with a ratchet 278 fast to the units wheel 274. A spring 279 mounted on the disk 276 retains the pawl 277 in engagement with the ratchet 278. Each time the disk 276 is rotated counter clockwise (Fig. 10) one step and then moved one step in reverse direction to normal position the pawl 277 engages the next succeeding tooth of the ratchet 278 and rotates the units wheel one step. Transfer pawls 280 mounted on the counter wheels engage star wheels 283 rigid with the counter wheels of next higher orders. Alining pawls 284 for each counter are loosely mounted on a corresponding rod 285 and springs compressed between the upper ends of the pawls and a cross bar 286 retain the alining noses of the pawls in engagement with the star wheels 283. As a counter wheel passes from its "9" to its "0" position, a flange or shoulder 288 on its pawl 280 engages a pin 289 on the corresponding alining arm 284 and as the pin prevents the pawl from moving out of the notch engagement between two of the teeth on the star wheel, the latter with the registering wheel of next higher order moves one step. When transfers are not necessary the pawl 280 rides idly over the star wheel of the counter wheel of next higher denomination.

Pawls 293 (Fig. 10) operated by springs 296 and carried by the counter wheels are adapted to engage a groove 294 in the shaft 273 so that when the shaft is rotated by a turn button 295 fast on the shaft the groove 294 in the shaft engages the pawls 293 and thereby rotates the counter wheels to zero position as is well known in the art.

The disk 276 (Fig. 9) carries a pin 297 which projects through a slot 301 in the frame 275 and into a recess formed in the outer end of an arm 298 fast on a shaft 299 journaled in the sides of the frame 275. There is one of these arms 298 and shafts 299 for each counter, and each shaft at its left hand end carries an arm 300. Pins 303 mounted on the arms 300 project into slots 304 formed in corresponding arms 305. The arms 305 are pivotally mounted by pins 302 on a bar 308, slidably mounted on pins which are mounted on the side frame 25 and project through slots 306 in the bar. The pins 201 on the denomination keys project into vertical slots 307 in the corresponding arms 305. The bar 308 is pivotally connected at 311 to the upper end of a lever 309

(Fig. 9) which is loosely mounted on the shaft 111. The lower end of the lever 309 carries a pin 310 which projects through a slot in the side frame 25 and into a cam groove 313 formed in the face of the gear 210.

From the above description it can be seen that when a denomination key is depressed its pin 201 is moved down in the slot 307 of the corresponding arm 305 so that when the bar 308 is moved forwardly by the cam groove 313 the arm 305 is caused to rock about its pivot 302. The pins 201 on the undepressed denomination keys remain in engagement with the upper ends of the slots 307 in their coresponding arms 305 so that when the bar 308 is operated these arms are only rocked a slight distance about their pivot 302. The rocking of the arm 305, appropriate to the depressed denomination key through its slot and pin connection with the arm 300 rocks this arm 300 and the corresponding shaft 299 and arm 298 sufficiently to oscillate the disk 276 of the appropriate counter one step to add "1" on the latter as above described. The rocking of the arms 305 for the undepressed denomination keys is not sufficient to oscillate the disks 276 of the corresponding counters a sufficient distance to operate these counters. It can, therefore, be seen that only the counter appropriate to the operated denomination key is operated to add "1" upon each cycle of operation of the machine.

*Printing mechanism.*

The ticket strip 316 (Fig. 11) is fed from a supply roll which is positioned under the machine but which is not shown in the drawings. The strip is fed from the supply roll through a guide or chute 317, between an electroroller 318 and an impression roller 319, between an electroroller 320 and an impression roller 323, thence between guide strips 324, and a type carrier 325 and a platen 326. The type carrier 325 is fast on a stub shaft 3261 supported by the side frame 24 of the machine and a frame 327 mounted on this side frame. A pinion 328 fast on the shaft 3261 meshes with an actuating segment gear 329 pivoted at 330 to the side frame 24. The segment gear 329 is pivotally connected at 3301 to one end of a link 333 which at its opposite end is pivotally connected at 334 to the arm 181 (Figs. 6 and 7). When the arm 181 is differentially positioned upon each cycle of operation of the machine it can be seen that the type carrier 325 through the link 333 and actuating segment 329 is adjusted differentially to bring the proper type to the printing line. While the type carrier is in adjusted position the platen 326 is operated to carry the ticket strip against the type in printing position.

The platen 326 is adjustably mounted by a screw 335 in a frame 336 which is mounted on the upper end of a lever 337 loosely mounted on the main drive shaft 23. The lower end of the lever 337 is pivotally connected to the rear end of a pitman 338 which at its forward end (Fig. 12) is forked over the shaft 208 and carries a roller projecting into the cam groove formed in a disk 339 fast on the shaft 208. The cam groove in the disk 339 is so constructed that the platen is operated while the type carrier is in adjusted position to take an impression from the type carrier onto the ticket strip during each cycle of operation of the machine.

An inking ribbon 340 through which the type carrier prints on the ticket strip is of the continuous type and passes between the type carrier 325 and the platen 326 over a guide on the frame 327 under a tension roller 341 carried in a pivoted frame 342, over a guide roller 351, between a feeding roller 352 and an ink supply roller 3528 and about a roller mounted on a stud 3521. The inking ribbon is fed upon each cycle of the machine by the rollers 352 and 3528, the roller 352 being rotated directly by a pawl 3522 which is mounted on a reciprocating bar 3523 and coöperates with a ratchet rigidly connected with the feeding roll 352. The bar 3523 is pivotally connected at its rear end to the lever 337 and is therefore reciprocated by the latter. A spring pressed pawl 3524 prevents retrograde movement of the feeding roll 352. The ink supply roll 3528 is mounted on a pivoted arm 3526 and a spring 3525 serves yieldingly to retain the roller 3528 in engagement with the feeding roll 352.

The electroroller 320 and impression roller 323 and the electroroller 318 and impression roller 319 are given one complete rotation upon each cycle of operation of the machine through the intermeshing gears shown in the drawings and as is well known in the art. The gear which is rigid with the electroroller 320 meshes with a gear 343 which is rigidly mounted on the main drive shaft 23 and the gear rigid with the impression roller 319 also meshes with this gear 343.

An inking roller 344 is employed to ink the electroplate (not shown) and a dating device 345 on the electroroller 320. An inking roller 346 is employed to ink the electroplate on the electroroller 318 and also the type of a consecutive numbering device 347 carried by the latter. The dating and consecutive numbering devices are well known in the art and as they are not essential to the understanding of the invention they are not described or shown in detail here.

The electrorollers 318 and 320 are provided with the usual feeding flanges coöperating with the impression rollers 319 and 323 respectively to feed the ticket strip upon each cycle of operation of the machine so that after each ticket is printed it is fed through a slot 348 in a frame 349 and through a slot 3481 in a stationary knife 350 mounted on the frame 349. A movable knife 353 is slidable on the stationary knife 350 and is connected by a pin 354 to a frame 355. The frame 355 is (Figs. 11 and 13) mounted on a rod 357 which is supported at its ends in two arms 358 loosely mounted on a rod 359. A lever 360 is loosely mounted on the rod 359 and at its upper end is connected to the arms 358 by a cross rod 361 which is carried by the arm 358 and projects through the lever 360. The lower end of the lever 360 carries a roller 362 projecting into a cam groove 364 formed in the face of the gear fast to the impression roller 323. This cam groove 364 is so constructed that upon each cycle of operation the lever 360 and arms 358 are rocked counter clockwise (Fig. 11) to move the movable knife 353 from over the 3481 slot in the stationary knife 350 and then after the ticket has been fed through this slot the lever 360 and arms 358 are returned to normal position whereupon the movable knife 353 coöperates with the stationary knife 350 to sever the ticket.

After a ticket has been fed into position to be severed and severed from the strip its lower end rests on top of the stationary knife 3504 against a guide strip 372. Near the end of the operation of the machine and after the varying number of tickets has been severed the tickets are fed together by the check ejecting mechanism, to be now described. This ejecting mechanism is adapted to feed the tickets so that they extend out of a hood 374 mounted on the cabinet 132 of the machine. The top of the hood is preferably of glass or other transparent material. As the tickets are partially fed out of the hood 324 by the ejecting mechanism they pass between the top of the hood and a hinged door 375 which is yieldingly retained in engagement with the top of the hood as shown in the drawings.

The check ejecting mechanism comprises knurled knobs 376 (Fig. 13) which are rigidly mounted on a shaft 377 and coöperate with knurled disks 378 loosely mounted on a cross rod 379. The shaft 377 is journaled at its right hand end in the printer frame 380 and near its left hand end in the side frame 24 of the machine. The ends of the cross rod 379 project through slots 383 (Fig. 11) formed in the vertical sides or ears of the frame 355. A spring 384 is coiled about the shaft 357 and its ends are so bent that they engage the cross rod 379 and yieldingly retain the coöperating knobs 376 and disks 378 in normal engagement. Forwardly extending fingers 385 on the frame 355 engage under the shaft 377 to guide the frame 355 in its reciprocation.

When the tickets are fed through the slot in the stationary knife 350, as above described, they pass between the coöperating knobs 376 and disks 378, these knobs and disks being separated at such times. Near the end of the operation of the machine and immediately after the last ticket has been severed from the ticket strip the shaft 377 is rotated whereupon the coöperating knobs 376 and disks 378 feed the severed tickets so that their upper ends project out of the hood 374 and pass the door 375. The smooth portions 381 of the peripheries of the disks 398 normally engage the smooth portions 382 of the knobs 376 so that the wear on the knurled portions of the knobs and disks is not as great as it would be if the knurled portions of the disks and knobs were in the same planes.

The means for rotating the shaft 377 near the end of the operation of the machine is shown in Figs. 13, 14, 16 and 17. A pinion 385 is rigidly mounted on the right hand end of the shaft 377 and meshes with the teeth 386 on the upper end of a lever 387 loosely mounted on the shaft 28. During the first cycle of operation of the machine and while the frame 355 is in its moved position the lever 387 is rocked from its normal position shown in Fig. 16 to its moved position shown in Fig. 17. The shaft 377 and therefore the knobs 376 are rotated by this movement of the lever 387 but at this time the knurled knobs 376 and disks 378 are not in engagement. To rock the lever 387 to its moved position shown in Fig. 17 a cam block 388 carried by a disk 389 fast on the main drive shaft 23 engages the downwardly extending arm 390 of the lever 387. Engagement of the lever 387 with a stationary stud 400 limits the movement of this lever. When the lever 387 is rocked to its moved position an arm 393 loosely mounted on the shaft 143 is rocked by its spring 394 to move its upper end under the lower bent end of an arm 395 of the lever 387 thereby retaining the latter in moved position. This arm 393 retains the lever 387 in moved position during the successive cycles of operation of the machine until near the end of the last cycle of operation when the arm 393 is rocked clockwise (Fig. 17) from under the arm 395. Then a spring 396, connected at its upper end to a pin on the arm 395 and at its lower end to a stationary pin 397, to which the spring 394 is also connected rocks the lever 387 to normal position whereupon the shaft 377 and its knurled knobs 376 are rotated to coöperate in the disks 378 for the purpose of ejecting the severed tickets, as above described.

In order to rock the arm 393 to normal position near the end of the operation of the machine, the following means is employed. An arm 398 is fast on the shaft 143 and carries a roller 399 normally engaging the rear edge of the arm 393. When a denomination key is depressed the shaft 143 is rocked counter clockwise (Figs. 16 and 17) as above described, by the coöperation of the roller 145 (Fig. 15) on the arm 144 in the slot 143 formed in the link 34, whereupon the roller 399 is moved rearwardly so that when lever 387 is moved to the position shown in Fig. 17 the spring 394 rocks the arm 393 into position to retain the lever 387 in moved position. Near the end of the last cycle of operation of the machine when the link 34 is lowered to normal position, the roller 399 through its engagement with the rear edge of the arm 393 rocks the latter to normal position whereupon the spring 396 moves the lever 387 to normal position to effect the ejection of the tickets.

If the purchaser or patron should hold his hand over the mouth of the hood 374 so that the ends of the tickets engaged his fingers the spring 396 would not be permitted to rock the lever 387 to normal position until the purchaser had removed his fingers out of the path of movement of the tickets. This is the case as the spring 384 (Figs. 11 and 13) causes the disks 378 and knobs 376 firmly to grip the severed tickets between them when the arm 393 is moved to normal position to permit operation of the lever 387 and as the ejection of the tickets is prevented the disks and knobs cannot be turned and hence the spring 396 is prevented from returning the lever 396 to normal position until the purchaser's fingers are moved out of engagement with the tickets at which time the spring 396 operates the lever 387 to eject the tickets.

*Operation.*

It is thought that the above description is sufficient for a complete understanding of the present invention and therefore a detailed statement of its operation will not be given.

Briefly it can be seen that the above described machine is admirably adapted to perform the objects and functions of the invention. Depression of a ticket key determines the number of cycles of operation of the machine and depression of a denomination key releases the operating mechanism and determines the denomination of the tickets to be issued and the amount to be added on the totalizer.

Figure 2:
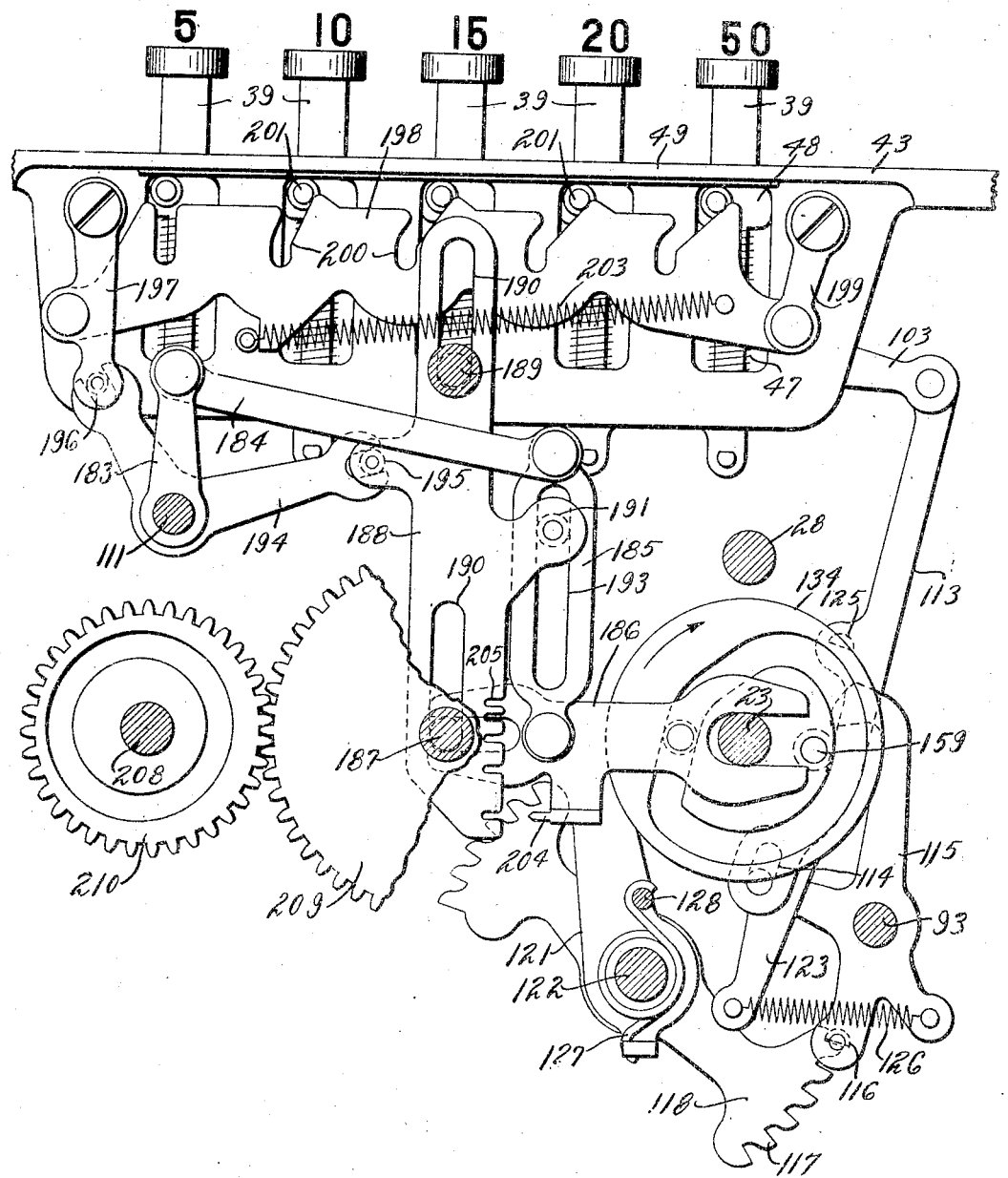
Fig. 2 is a transverse vertical section taken just within the right hand side frame of the machine and showing part of the differential mechanism for the totalizing mechanism, and other parts controlled by the denomination keys.

During an operation of the machine in which 5, 10, 15 or 20 cent tickets are issued the totalizer actuator 170 (Fig. 6) is connected by the lever 178 to the arm 181 so that when this arm is rocked differentially under the control of the depressed denomination key and by the mechanism shown in Fig. 2, the actuator 170 is operated to add the value of the tickets issued on the totalizer. When the 50 cent key is depressed, however, it moves the plate 218 forwardly if it is not already in such position whereby the lever 178 is operated to disconnect the arm 181 from the actuator 170 so that when the totalizer is rocked into engagement with the latter no amount is added on the totalizer.

It can also be seen from the description of the ticket counters and the operating mechanism therefor, (shown in Figs. 8 and 9) only the ticket counter appropriate to the depressed denomination key is operated.

Upon each complete cycle of operation of the machine the printing mechanism (Fig. 11) is given one cycle of operation to print a ticket and sever it from the ticket strip. Then near the end of the last cycle of operation of the machine the shaft 377 of the ejecting mechanism is rotated by the return movement of the lever 387 to normal position whereupon all of the severed tickets are partially ejected past the door 375 so that they may readily be withdrawn from the machine.

While the form of mechanism herein shown and described is admirably adapted to fulfil the objects primarily stated it is to be understood that it is not intended to confine the invention to the one form of embodiment herein shown as it is susceptible of embodiment in various forms all coming within the scope of the claims which follow.

What is claimed is:—

1. In a machine of the class described, the combination with means for feeding a ticket strip, of means for severing a plurality of tickets from one another and from the strip, and means for ejecting the severed tickets together.

2. In a machine of the class described, the combination with operating mechanism, of means for feeding a ticket strip, means for severing a variable number of tickets from one another and from the strip at each operation of the machine, and means for ejecting the severed tickets together after the last ticket has been severed.

3. In a machine of the class described, the combination with a main operating mechanism having a variable operation, of means for severing a variable number of tickets from one another and from a ticket strip at each operation of the machine and means for ejecting the severed tickets together near the end of the operation of the machine.

4. In a machine of the class described, the combination with operating mechanism of ticket issuing mechanism adapted to issue a plurality of separate tickets into ejecting position at each operation of the machine and means for ejecting the separate tickets together.

5. In a machine of the class described, the combination with a main operating mechanism having a variable operation, of ticket issuing mechanism adapted to issue a varying number of separate tickets into ejecting position, the number of tickets being dependent upon the period of operation of the machine, and means for ejecting the separate tickets together.

6. In a machine of the class described, the combination with a main operating mechanism adapted to be given a variable number of cycles of operation during different operations of the machine, of means for severing a ticket from a ticket strip at each cycle of operation of the machine, and means for ejecting the severed tickets together during the last cycle of operation of the machine.

7. In a machine of the class described, the combination with a main operating mechanism adapted to be given a variable number of cycles of operation during different operations of the machine, of ticket issuing mechanism for issuing a separate ticket into ejecting position upon each cycle of operation of the machine, and means for ejecting the tickets in ejecting position together during the last cycle of operation of the machine.

8. In a machine of the class described, the combination with a main operating mechanism, of means for feeding a ticket strip, means for severing a plurality of tickets from each other and from the ticket strip, and means for ejecting the severed tickets together near the end of the operation of the machine.

9. In a machine of the class described, the combination with a main operating mechanism, of means for feeding a ticket strip, means for severing a plurality of tickets from one another and from the ticket strip, coöperating ejecting members, and means for operating said ejecting members to eject the severed tickets together after the last ticket is severed.

10. In a machine of the class described, the combination with a main operating mechanism, of means for feeding a ticket strip, means for severing a plurality of tickets from one another and from the ticket strip at a single operation, coöperating ejecting members out of coöperative relation when the ticket strip is fed, means for moving the members out of and into coöperative relation, and means for rotating said members after the last ticket has been severed and while the members are in coöperative relation to eject the severed tickets together.

11. In a machine of the class described, the combination with a main operating mechanism having a variable operation, of means for feeding a ticket strip, means for severing a variable number of tickets from one another and from the ticket strip, coöperating ejecting members, an element moved in one direction near the beginning of the operation of the machine, means for retaining said element in moved position, and means for disabling said retaining means near the end of the operation of the machine whereupon said element operates said ejecting members to eject the severed tickets together.

12. In a machine of the class described, the combination with a main operating mechanism, adapted to be given a variable number of cycles of operation upon different operations of the machine, of means for feeding a ticket strip, means for severing a ticket from the strip upon each cycle of operation of the machine, coöperating ejecting members adapted to be moved out of and into coöperative relation upon each cycle of operation, and means for operating said members when in coöperative relation during the last cycle of operation to eject the severed tickets together.

13. In a machine of the class described, the combination with a main operating mechanism having a variable operation, of means for feeding a ticket strip, means for severing a variable number of tickets from one another and from the ticket strip, two rotating ejecting members, a segment gear for operating said members, means for moving said segment gear from normal position near the beginning of the operation of the machine, a device for retaining said segment gear in moved position, and mechanism for disabling said retaining device and moving said member to normal position near the end of the operation of the machine to operate said ejecting members and thereby eject the severed tickets together.

14. In a machine of the class described, the combination with a main operating mechanism, of means for issuing a variable number of separate tickets into ejecting position during an operation of the machine, two rotating ejecting members, a segment gear for operating said members, and means for moving said segment gear near the end of the operation of the machine to operate said ejecting members and thereby eject the tickets in ejecting position together.

15. In a machine of the class described, the combination with a main operating mechanism adapted to be given a variable number of cycles of operation, of means for issuing a separate ticket into ejecting position upon each cycle of operation of the machine, two rotating ejecting members, means for moving said members out of and into coöperative relation during each cycle of operation, a segment gear, and means for moving said segment gear during the last cycle of operation of the machine and while said ejecting members are in coöperative relation to operate the latter and thereby eject the tickets in ejecting position together.

16. In a machine of the class described, the combination with a main operating mechanism, of means for issuing a variable number of separate tickets into ejecting position during an operation of the machine, two rotating ejecting members between which the tickets are issued into ejecting position, a segment gear for operating one of said ejecting members, a spring for moving said segment gear from normal position near the beginning of the operation of the machine, means for retaining said segment gear in moved position, and means for disabling said retaining means and moving said segment gear to normal position to operate said ejecting members and thereby eject the tickets in ejecting position together.

17. In a machine of the class described, the combination with a main operating mechanism, of means for issuing a ticket into ejecting position, coöperating ejecting members out of coöperative relation when the ticket strip is issued into ejecting position, means for moving the members out of and into coöperative relation, and means for rotating said members, while they are in coöperative relation, to eject the ticket in ejecting position.

18. In a machine of the class described, the combination with a main operating mechanism, of means for feeding a ticket strip, means for severing a ticket from said strip, two rotating ejecting members between which the ticket is fed, means for moving an element from normal position and retaining said element in moved position until after the ticket is severed, and a spring for restoring said element to normal position—the element being constructed to operate said members for the purpose of ejecting the severed ticket when the element is restored to normal position.

19. In a machine of the class described, the combination with a main operating mechanism, of means for feeding a ticket strip, means for severing a ticket strip, means for severing a ticket from the strip, coöperating ejecting members rotatable to eject the severed ticket, and means for rotating said members after the ticket is severed to eject the ticket.

20. In a machine of the class described, the combination with a main operating mechanism, of means for feeding a ticket strip, means for severing a ticket from the strip, coöperating ejecting members rotatable to eject the severed ticket, and a spring for rotating said members after the ticket is severed to eject the ticket.

21. In a machine of the class described, the combination with a main operating mechanism, of means for issuing a ticket into ejecting position, coöperating ejecting members out of coöperative relation when a ticket is issued into ejecting position, means for moving the members out of and into coöperative relation, a segment gear for rotating said members, means for moving said segment gear in one direction, and a spring for moving said segment gear in the opposite direction while the members are in coöperative relation whereby the latter eject the ticket in ejecting position.

In testimony whereof I affix my signature.

FRANCESCO SKERL.